2,932,619

Patented Apr. 12, 1960

2,932,619

PRODUCTION OF ADSORPTIVE CHARCOAL FROM PETROLEUM RESIDUAL STOCKS CONTAINING ASPHALTENES

Marvin F. L. Johnson, Homewood, Ill., and Joseph Cole, Whiting, Ind., assignors to Sinclair Refining Company, New York, N.Y., a corporation of Maine No Drawing. Application March 5, 1957
Serial No. 643,919

2 Claims. (Cl. 252—421)

This invention relates to the production of adsorptive charcoal. More particularly, it relates to the production of adsorptive charcoal from asphaltenes derived from petroleum residues.

The use of charcoal as a purifying agent had been known long before its adsorptive properties were realized. The production of many types of charcoal by the combustion of various carbonaceous materials such as wood, bone, blood, etc. has been practiced for quite some time. With the realization of the adsorptive properties of the various types of charcoal, has come a multitude of different methods of charcoal production; each method producing a different type of charcoal with different properties. The common desirable property of all charcoals is a large surface area per unit of weight thus providing a maximum adsorptive surface with a minimum amount of charcoal being employed.

We have now found that adsorptive charcoal can be prepared from asphaltenes having a melting point above about 600° F. derived from petroleum residual stocks or asphalts.

According to our invention, the asphaltenes are contacted with a gas stream composed of an inert gas and a maximum of about 5% free oxygen at a temperature of about 400° to about 900° F. for a time sufficient to remove about 30-70, preferably about 45-55 weight percent of the original material. The inert diluent gas can be any inert gas such as nitrogen or flue gas, or it can be steam, which itself will have some activity although still being relatively inert. The resulting charcoal generally has an adsorptive area of upwards of 140 square meters per gram (BET method) and small pores. Further activation for improved adsorptive capacity (higher area and larger pores) is accomplished by treatment with a relatively inert gas, e.g. steam, flue gas, carbon dioxide or hydrogen, with or without promoters, at temperatures of about 1000° to 1800° F., until the product has a surface area of at least about 500 square meters per gram (BET method).

Petroleum asphalts are conventionally produced as by-prdoucts of pteroleum refinery operations. For example, an initial atmospheric distillation of a naphthenic or asphaltic crude oil separates the light portions, such as gasoline, kerosene and gas oil, leaving a light residue similar to heavy fuel oil and containing heavier oil fractions and asphalt. The light residue is then distilled under vacuum and lubrcating-oil-type fractions are taken overhead leaving the asphalt as a residue. In another type of separation the light residue is contacted with, for example, liquid propane and the light fractions are dissolved leaving asphalt as the bottoms. Similarly asphalts can be obtained from the residues of thermal cracking operations. Cracked residues can be transformed into cracked asphalts by separation of lighter distillates as well as by oxidation. The mild oxidation of cracked residues by air at temperatures of the order of 550° F. produces neutral resins and asphaltenes as a result of oxidation. Asphaltenes useful in the process of our invention thus can be separated from straight-run or cracked petroleum residues or from the asphalts derived from these residues.

Asphaltenes are conventionally separated from petroleum residues and asphalts by precipitation with an excess of, for example, a petroleum ether having a boiling range of from 30° to 40° C. Asphaltenes are also insoluble in carbon tetrachloride, low boiling paraffinic solvents, and certain oxygenated solvents such as acetone and the lower boiling alcohols and ketones. Since asphaltenes are soluble in aromatics, such solvents cannot be used.

To obtain asphaltenes having a melting point above about 600° F., however, we have found it particularly advantageous to extract the petroleum residue or asphalt with a paraffinic solvent preferably having 3 to 7 carbon atoms such as propane, butane, pentane, hexane and heptane and then with an oxygen-containing non-aromatic organic solvent preferably containing up to 5 carbon atoms such as methonol, acetone, methyl ethyl ketone, methyl n-propyl ketone, and diethyl ketone. We prefer to extract the petroleum residue with n-pentane and then with acetone. The temperature of extraction can be from ambient to the boiling point of the solvent with 100°-150° F. being preferred. Unless a countercurrent extraction is employed, more than one extraction with each solvent is also preferred.

The ratio of paraffinic solvent to residual stock is ordinarily within the range of about 5-15:1 parts by volume and the ratio of oxygen-containing solvent to precipitated solids is also within the range of about 5-15:1 parts by volume.

The process of our invention is further illustrated by the following example.

Five gallons of the raffinate from a propane deasphalting operation on a Mid-Continent petroleum residual stock are contacted with ten times its volume of n-pentane at a temperature of 70° to 80° F. for 48 hours. The precipitated solids are separated by decantation and washed. They represent 16% by weight of the original material and melt at about 300° F.

The solids insoluble in pentane are then extracted with acetone at 130° F. and 22% of solids remain. These solids melt at above 600° F.

7.40 grams of the solids are placed in a one inch glass reactor tube which has a sintered glass disc near the bottom to support the solids. A gas stream containing 2% oxygen and 98% nitrogen is bubbled through water and then passed through the reactor while the temperature increases to 400° F. Over a period of 10 hours, the temperature is increased to 752° F., which temperature is maintained for an additional 20 hours. The contents of the reactor are then blocked off from the atmosphere and allowed to cool. The charcoal is then recovered and activated. In the final activation, the charcoal is treated at 1400° F. with steam for 8 hours. The resulting product has a surface area of greater than 500 square meters per gram (BET method).

We claim:

1. A process for preparing adsorptive charcoal from petroleum residual stocks containing asphaltenes which includes contacting the residual stock with a paraffinic solvent having 3 to 7 carbon atoms, separating the precipitated solids containing asphaltenes, contacting the solids with an oxygen-containing non-aromatic organic solvent having up to 5 carbon atoms, separating the remaining solids, which are asphaltenes having a melting point above 600° F., contacting these solids with a gas stream composed of an inert gas and from 1 to 5% free oxygen at a temperature of about 400° F. to about 900° F. for a time sufficient to remove about 30-70 weight percent of the original material, and activating the resulting solids by contact with an inert gas in the substantial absence of free oxygen at a temperature of about 1000° to 1800° F. to obtain an adsorptive charcoal product having a surface area of at least about 500 square meters per gram by the BET method.

2. A process for preparing adsorptive charcoal from petroleum residual stocks containing asphaltenes which includes contacting the residual stock with n-pentane, separating the precipitated solids containing asphaltenes, contacting the solids with acetone, separating the remaining solids, which are asphaltenes having a melting point above 600° F., contacting these solids with a gas stream composed of an inert gas and from 1 to 5% free oxygen at a temperature of about 400° F. to about 900° F. for a time sufficient to remove about 30–70 weight percent of the original material, and activating the resulting solids by contact with steam in the substantial absence of free oxygen at a temperature of about 1000° to 1800° F. to obtain an adsorptive charcoal product having a surface area of at least about 500 square meters per gram by the BET method.

References Cited in the file of this patent

UNITED STATES PATENTS

| | | |
|---|---|---|
| 2,549,298 | Donegan | Apr. 17, 1951 |
| 2,631,982 | Donegan | Mar. 17, 1953 |
| 2,681,318 | Mayer | June 15, 1954 |

OTHER REFERENCES

Abraham's "Asphalt and Allied Substances," vol. 1 (1945), pp. 514–515.